United States Patent [19]
Jonas et al.

[11] 3,749,900
[45] July 31, 1973

[54] ADJUSTABLE FLASH UNIT MOUNT

[75] Inventors: Hans Jonas; Bert Stein, both of Pittsburgh, Pa.

[73] Assignee: Hans Jonas, Pittsburgh, Pa.

[22] Filed: July 13, 1971

[21] Appl. No.: 162,117

[52] U.S. Cl................................. 240/1.3, 248/183
[51] Int. Cl............................................ B03b 15/02
[58] Field of Search.......................... 240/1.3; 95/86; 248/183

[56] References Cited
UNITED STATES PATENTS

| | | | |
|---|---|---|---|
| 2,310,165 | 2/1943 | Steiner | 240/1.3 |
| 2,599,269 | 6/1952 | Markel | 240/1.3 |
| 3,333,519 | 8/1967 | Padelt | 240/1.3 |
| 2,375,690 | 5/1945 | Reeves | 248/183 |
| 2,461,175 | 2/1949 | Peterson | 248/183 |

*Primary Examiner*—S. Clement Swisher
*Attorney*—Clarence A. O'Brien and Harvey B. Jacobson

[57] ABSTRACT

A mount for attaching a flash unit to a camera including a camera mounting portion, a flash unit mounting portion and a third connecting portion connecting the camera mounting portion to the flash mounting portion. The flash mounting portion is rotatably adjustable relative to the connecting portion about a first axis and the camera mounting portion is rotatably adjustable relative to the connecting portion about a second axis disposed at right angles relative to the first mentioned axis whereby the direction in which the flash supported from the camera by the mount may be universally adjusted relative to the direction in which the associated camera faces.

2 Claims, 5 Drawing Figures

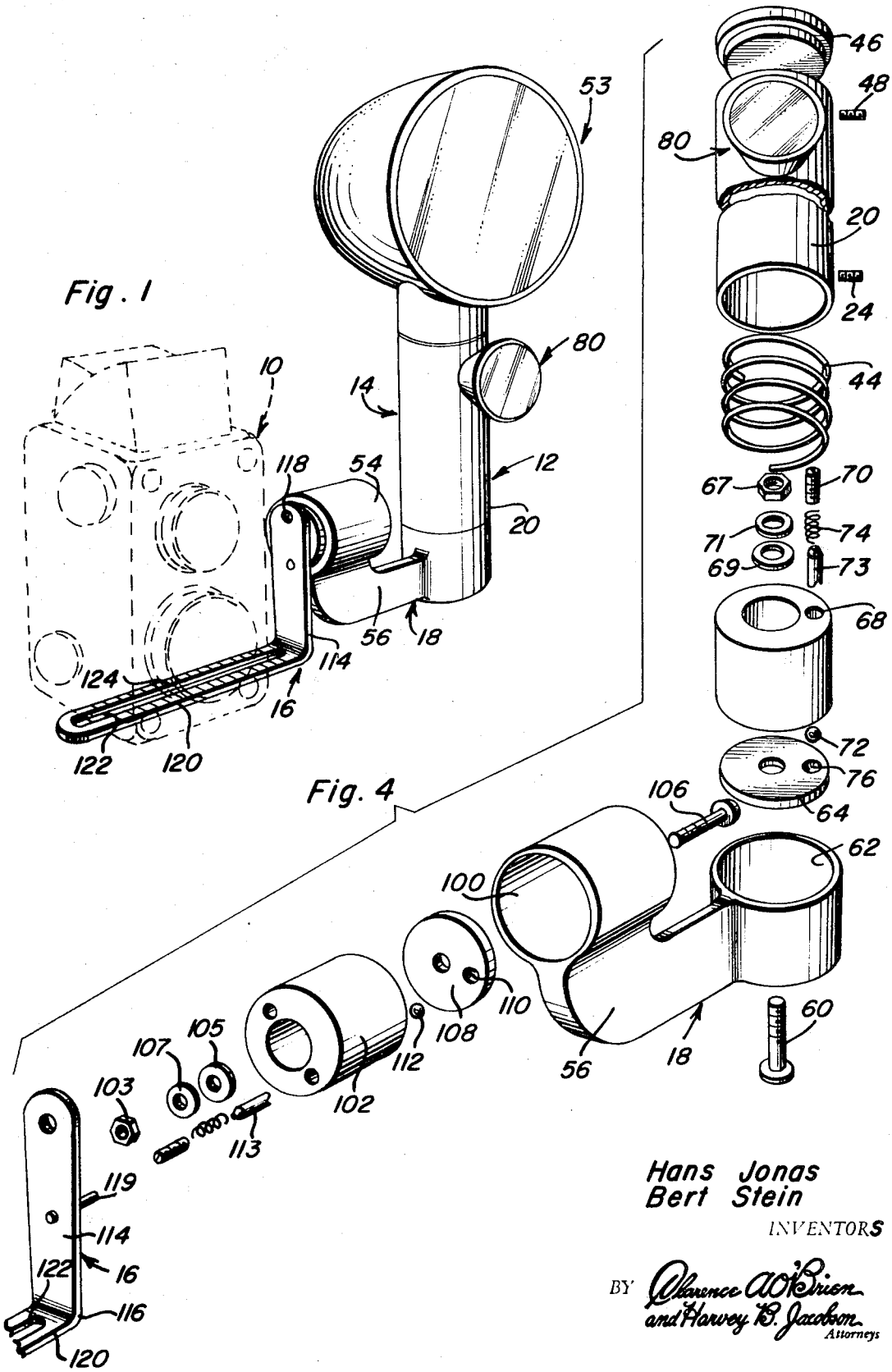

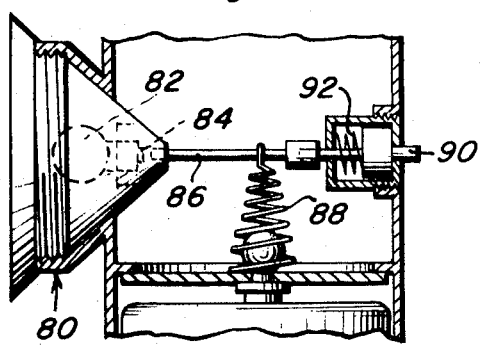
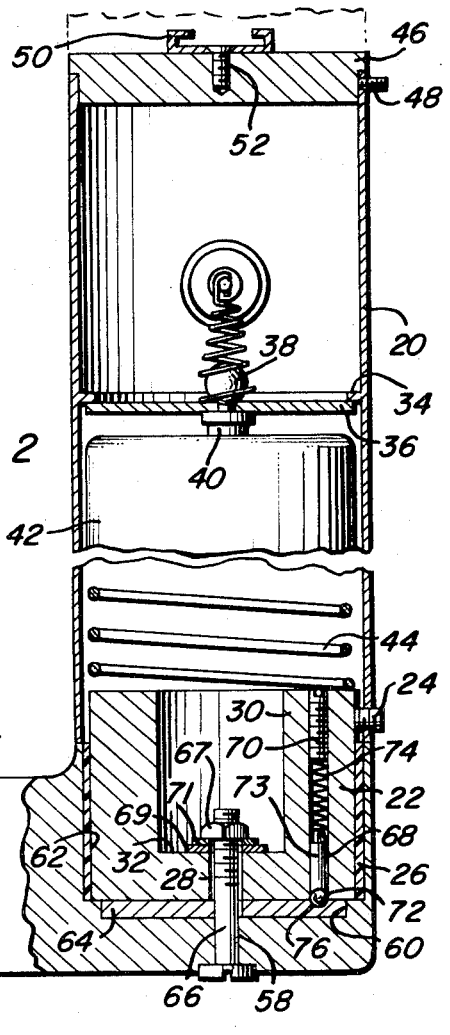
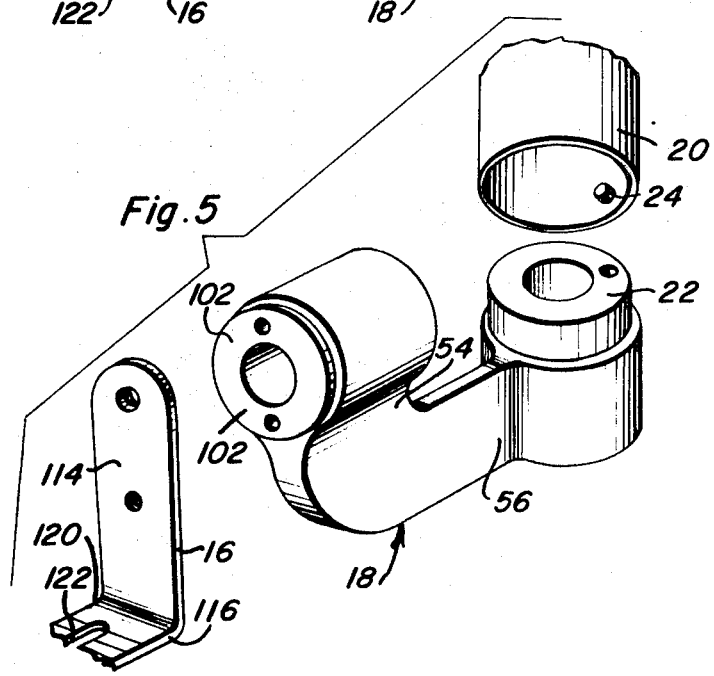
Hans Jonas
Bert Stein
INVENTORS

ADJUSTABLE FLASH UNIT MOUNT

The mount of the instant invention has been specifically designed to enable precise directing of the flash from a camera mounted flash unit independent of the direction in which the camera is facing. The mount has further been specifically designed for use in conjunction with a flash unit provided with a modeling light which faces in the same direction as the light source of the flash unit and may be utilized, prior to the taking of a photograph and during adjustment of the flash unit relative to the associated camera in order to ascertain the illumination of the subject to be photographed which will be provided by the flash unit upon the taking of a picture with the associated camera.

If a photograph is to be taken along a wall from a point spaced outwardly of the wall and the flash unit of a camera to be utilized in taking the picture faces the same direction in which the camera faces, the wall surfaces in the center of the photograph to be taken as well as those wall surfaces spaced closer to the camera will be over-illuminated in relation to the wall surfaces disposed further from the camera than those wall surfaces to be centered in the photograph to be taken. In such an instance as well as other instances, it is desirable that the center of the illumination afforded by the flash unit be directed further down the wall rather than at the wall portion to be centered in the photograph to be taken.

Accordingly, it is the main object of the this invention to provide a flash unit mount for mounting a flash unit on a camera constructed in a manner whereby the flash unit may be universally adjusted relative to the camera so that the center of the illumination afforded by the flash unit may be directed as desired independent of the center of the area to be photographed.

It is a further object of this invention to provide a flash unit mount in accordance with the preceding object for utilization in conjunction with a flash unit provided with a modeling light affording generally the same angle of illumination as that to be afforded by the flash unit and facing in the same direction as the flash unit in order that the modeling light may be actuated during adjustment of the flash unit relative to the associated camera whereby the illumination to be afforded by the flash unit at the time the desired picture is taken may be precisely directed to afford the desired end result in the photograph to be taken.

Yet another object of this invention is to provide a flash unit mount constructed in a manner whereby the associated flash unit may be readily adjusted so as to face in precisely the same direction as the associated camera, if desired, without the use of the aforementioned modeling light.

A final object of this invention to be specifically enumerated herein is to provide a combined flash unit with modeling light and flash unit to camera mount combination in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the combined flash unit and flash unit-to-camera mount assembly of the instant invention;

FIG. 2 is an enlarged fragmentary sectional view taken substantially upon a plane passing through the center of the assemblage illustrated in FIG. 1 and with portions of the flash unit and mount assembly broken away;

FIG. 3 is a fragmentary vertical sectional view taken substantially upon a plane passing through the center of the modeling light of the flash unit;

FIG. 4 is an exploded perspective view of the combined flash unit and flash unit-to-camera mount assembly; and FIG. 5 is a further fragmentary perspective view of the flash unit and flash unit-to-camera mount assembly.

Referring now more specifically to the drawings the numeral 10 generally designates a conventional form of camera and the reference numeral 12 generally designates a combined flash unit and flash unit-to-camera mount assembled of the instant invention.

The assembly 12 includes a further flash unit section referred to in general by reference numeral 14, a second camera mount unit referred to in general by the reference numeral 16 and a third flash unit-to-camera mount connecting section referred to in general by the reference numeral 18.

The section 14 includes a handgrip defining and modelng light battery housing body tube 20 in one end of which a spindle 22 is removably secured by means of a setscrew 24. The spindle 22 has one end thereof which projects outwardly from corresponding end of the tube 20 and has a plastic bearing sleeve 26 disposed thereover. In addition, the spindle 22 has a longitudinal bore 28 formed therethrough including a diametrically enlarged counter-bore 30 at its inner end with a houlder 32 being defined between the inner end of the counter-bore 30 and the adjacent end of the bore 28. The tube 20 is disposed in an upright position and is carried at its lower end by spindle 22.

An intermediate portion of the tube 20 includes a circumferential inwardly projecting flange 34 and an insulative washer 36 is disposed under the flange 34 and snugly received within the tube 20. A conductive contact 38 extends through the insulative washer 36 and the upper terminal 40 of a battery 42 disposed in the lower portion of the tube 20 contacts the underside of the terminal 40, the battery 42 being telescoped within the lower end of the tube 20 and biased upwardly therein by means of a conductive compression spring 44 interposed between the lower end of the battery 42 and the upper end of the spindle 22.

The upper end of the tube 20 has a flash unit supporting plug 46 secured therein by means of a setscrew 48 and the plug 46 has a flash unit supporting shoe 50 secured to its upper surface by means of a suitable fastener 52. A flash unit referred to in general by the reference numeral 53 is removably supported from the shoe 50 and may be operatively connected to the shutter unit of the camera 10 in any conventional manner, the unit 52 including its own source of electrical potential.

The connecting section 18 comprises an L-shaped member including right angulated legs 54 and 56. The free end of the leg 56 includes a transverse bore 58 formed therethrough and the bore 58 includes first and second counter-bores 60 and 62. The spindle 22 and bearing sleeve 26 are snugly telescoped within the second counter-bore 62 and seated against a thrust washer 64 stationarily disposed within the first counter-bore 60. A threaded fastener 66 is secured through the bores 58 and 28 by a self-locking nut 67, a plastic washer 69 and a metal washer 71 in order to rotatably retain the spindle 22 and the bearing sleeve 26 within the second counter-bore 62 for rotatable support of the housing tube 20 from the free end of the first leg 56 of the connecting section 18.

The spindle 22 includes a longitudinal bore 68 accentrically disposed relative to the bore 28 and the end of the bore 68 corresponding to the open end of the counter-bore 30 is internally threaded and has a threaded adjusting plug 70 threadedly engaged therein. A detent ball 72 is disposed in the end of the bore 68 remote from the plug 70 and seated in an end recess formed in a follower 73 disposed within the bore 68 and backed by a compression spring 74 positioned between the plug 70 and the follower 73. Further, the first washer 64 includes a detent recess 76 with which the detent ball 72 is registrable upon angular displacement of the housing tube 20 relative to the leg 56 to a position with the flash unit 53 facing in a direction disposed at right angles relative to the leg 56.

The housing tube 20 further includes a modeling light assembly referred to in general by the reference numeral 80 and the modeling light assembly 80 includes an incondescent bulb 82 having a contact 84 with which a transverse contact pin 86 reciprocal transversely of the tube 20 is engageable. A spring 88 electrically connects the terminal or contact 38 with the pin 86 and the end of the pin 86 remote from the contact 84 includes a non-conductive push-button portion 90 engageable from the exterior of the tube 20 and the spring urged to an outer limit position by means of a compression spring 92 with the contact pin retracted away from the contact 84. The push-button portion 90 is displaceable inwardly relative to the tube 20 by thumb pressure in order to axially shift the pin 86 into contact with the contact 84 thus electrically connecting the battery 42 with the bulb 82. The modeling light assembly has a beam spread approximating the center of the beam spread of the flash unit 53 and the modeling light assembly 80 faces in the same direction as the flash unit 53. Accordingly, the push button portion 90 may be momentarily actuated in order to enable the modeling light assembly 80 to cast light in the same direction as light will be cast by the flash unit 53 upon actuation of the latter.

The free end of the leg 54 includes a transverse bore 96 having first and second counter-bore 98 and 100. A second spindle 102 having a second plastic bearing sleeve 104 telescoped thereover is anchored in the second counter-bore 100 by means of a fastener 106, a nut 103 and plastic and metal washers 105 and 107, respectively, disposed within a counter-bore 130 formed in the spindle 102 and bearing against the shoulder 132 corresponding to the shoulder 32. The inner end of the second spindle 102 bears against a second thrust washer 108 corresponding to the thrust washer 64 and seated in the counter-bore 98. In addition, the washer 108 includes a detent recess 110 corresponding to the recess 76 and a spring urged detent ball 112 and follower 113 corresponding to the detent pin 72 and follower 73 are provided. Accordingly, the spindle 102 may be adjustably angularly displaced about the longitudinal axis of the bore 96 and secured in a predetermined rotated position by means of the detent ball 112 and the detent recess 110. The outer end of the second spindle 102 has the first arm 114 of an L-shaped mounting bracket 116 secured thereto by means of fasteners 118 and a locking pin 119 received in the bore 121 corresponding to the bore 68. The second arm 120 of the bracket 116 has a longitudinal slot 122 formed therein through which a threaded fastener 124, see FIG. 1, may be passed in order to secure the second leg 120 to the bottom of the camera 10.

In operation, with the camera 10 mounted on the second leg 120 of the bracket 116 in the manner illustrated by phantom lines of FIG. 1 of the drawings and the spindles 22 and 102 rotated to the predetermined positions thereof as established by the ball 72 and the recess 76 and the ball 112 and the recess 110, the flash unit 53 faces in the same direction as the camera 10. Further, the modeling light assembly 80 also faces in the same direction.

If it is desired, prior to photographing a predetermined subject, to direct the light which will be cast by the flash unit 53 in a direction other than the direction in which the camera 10 faces, the spindle 22 may be rotated relative to the free end of the leg 56 and the free end of the leg 54 may be rotated relative to the spindle 102. In order to determine the lighting which will be afforded by the flash unit 53 when the latter is not facing in the same direction as the camera 10, the modeling light actuating push-button portion 90 may be pressed inwardly so as to actuate the modeling light assembly 80 whereupon the latter will cast a beam spread of light upon the subject to be photographed approximately as the center beam spread of the flash unit used during the taking of the desired photograph.

As an example: In a photograph of a straight line of 10 to 15 people wherein the camera and flash would be at an approximately 45° angle to this line-up, the flash mount assembly 12 would allow the photographer, while looking through the viewfinder of his camera, to adjust the beam spread of his flash unit 53 by actuating the modeling light and shining it toward the far end of this group by pivoting the tube 20 about its vertical axis of rotation. The flash unit 53 used to make the photograph would thus also be redirected toward the far end of the group balancing the amount of light to be given the person closest to the camera with the amount of light to be given the person furthest from the camera in such a manner as to give each person in the photograph to be taken an almost equal amount of light from the flash unit 53. This is most desirable since it prevents the person closest to the flash from receiving too much light, and therefore appearing too light in the photograph, and the person furthest from the flash receiving too little light, and thus appearing too dark in the photograph. This same principle holds true when photographing subjects that may be spaced apart vertically in planes progressively further from the camera and flash.

Also, in the case of making a photograph of someone sitting behind a desk, the modeling light would be actuated and its beam so placed as to show the center of the flash over the head if the person is at the desk. This would, in the photograph, delete some of the light from the front of the desk therefore showing it not too light. Were the flash not adjusted into this position, the front of the desk being closest to the camera would receive the greatest amount of light and would appear in the photo lighter then it is. In some cases both vertical and horizontal adjustments may be desirable and of course can be used at the same time. After the photograph is taken the photographer can readily bring his flash back into the normal position where camera 10 and flash unit 53 are facing in the same direction by turning tube 20 and camera 10 until the detent balls 72 and 112 snap back into detent recesses 76 and 110, respectively. This produces an audible sound and assures the photographer, without further having to check the equipment, that both camera and flash are lined up in the normal position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a camera flash attachment having a main flash unit for casting a flash of light in a predetermined direction, said attachment further including a modeling light supported on said flash attachment for casting a beam of light in the same direction, a modeling light actuator for actuating said modeling light independent of actuation of said main flash unit, said attachment including an upstanding handgrip defining a tubular body disposed at right angles relative to said direction, said body being adapted to contain batteries for electrically actuating said modeling light, said main flash unit and modeling light being supported from the upper end portion of said tubular body, a mount assembly for attaching said attachment to a camera, said mount assembly including first and second sections, said first section comprising an L-shaped member including relatively short right angulated legs, first means mounting the lower end of said tubular body on one of said legs for rotation about a first axis generally concentric with said tubular body and disposed at right angles relative to said one leg, said second section comprising a second L-shaped member including right angulated short and long arms, second means supporting said short arm of said second section from the second leg of said first section for relative angular displacement of said short arm and second leg about an axis disposed at right angles relative to said short arm and second leg and also disposed at right angles relative to the first mentioned axis whereby said short arm and second leg are relatively swingable in parallel planes, said long arm including means for stationarily mounting a camera thereon.

2. The combination of claim 1 wherein said first and second means include detent means operative to releasably retain said unit and second section in predetermined adjusted rotated portions relative to said first section.

* * * * *